United States Patent
Maleiro Vilarino et al.

(10) Patent No.: US 8,038,338 B2
(45) Date of Patent: Oct. 18, 2011

(54) BLENDER ARM AND FOOD PROCESSOR

(75) Inventors: Jose Manuel Maleiro Vilarino, Varginha (BR); Heimo Obersteiner, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 980 days.

(21) Appl. No.: 11/917,121

(22) PCT Filed: Jun. 2, 2006

(86) PCT No.: PCT/IB2006/051775
§ 371 (c)(1),
(2), (4) Date: Dec. 10, 2007

(87) PCT Pub. No.: WO2006/131868
PCT Pub. Date: Dec. 14, 2006

(65) Prior Publication Data
US 2008/0198693 A1    Aug. 21, 2008

(30) Foreign Application Priority Data
Jun. 10, 2005   (EP) .................................... 05105117

(51) Int. Cl.
*B01F 7/16* (2006.01)
(52) U.S. Cl. .......................... 366/129; 366/286; 366/601
(58) Field of Classification Search .................. 366/129, 366/601, 286, 130
See application file for complete search history.

(56) References Cited

U.S. PATENT DOCUMENTS

| 4,405,998 | A  | * | 9/1983  | Brison ......................... 366/264 |
| 5,810,472 | A  | * | 9/1998  | Penaranda et al. ............ 366/129 |
| 5,863,118 | A  | * | 1/1999  | Ackels et al. ................. 366/129 |
| 6,186,056 | B1 |   | 2/2001  | Bruno |
| 6,293,691 | B1 | * | 9/2001  | Rebordosa et al. ........... 366/129 |
| 6,974,244 | B1 | * | 12/2005 | Lin ................................ 366/129 |
| 7,066,639 | B2 | * | 6/2006  | Naud et al. .................... 366/129 |
| 2008/0198693 | A1 | * | 8/2008 | Lameiro Vilarino et al. . 366/286 |

FOREIGN PATENT DOCUMENTS

| DE | 1224007    | 9/1966  |
| DE | 19750813   | 6/1999  |
| EP | 1407701    | 4/2004  |
| LU | 35534      | 10/1957 |
| WO | 03086598   | 10/2003 |
| WO | 2004034862 | 4/2004  |

* cited by examiner

*Primary Examiner* — Tony G Soohoo
(74) *Attorney, Agent, or Firm* — Sherry Womack

(57) ABSTRACT

A blender arm includes a tubular body equipped at one end with a connection for a power unit. The blender arm further includes a rotary shaft having a tool at the end opposite to the connection end. A peripheral protection is provided around the tool. The rotary shaft with the tool is attached movably in axial direction to the tubular body so that the tool may be positioned in a retracted position for operation or a protracted position for cleaning, without having to touch the tool with the hands. The blender arm may further include a resilient element, functionally connected to the tubular body and the rotary shaft, for moving the rotary shaft between the protracted and retracted positions. When the rotary shaft is releases, the tool automatically returns to the retracted position.

6 Claims, 9 Drawing Sheets

BLENDER ARM AND FOOD PROCESSOR

The present invention relates to a blender arm having a tubular body equipped at one end with a connection for a power unit, including axially a rotary shaft with a tool at the end opposite to the connection end, around which tool a peripheral protection is established, as well as to a food processor with such a blender arm.

Food processors with a blender arm are often used for chopping, pureeing, grinding, mincing or mixing, for example when making soups, sauces, drinks etc. During this process, sometimes some residues, e.g. food fibers get stuck in the area behind the blending tool. The usual way to clean the blender arm is to put the end with the tool and the peripheral protection under a flush of water. Often, this is not enough to totally remove the residues. Since there is no direct access to the area behind the tool, a thorough cleaning is difficult.

EP 1 407 701 A1 describes a grinding or mincer arm with a removable end for cleaning purposes. The mincer arm is connected in a removable way with respect to an operation motor block of a manual electric household appliance, being applied for example for the preparation of food. The arm includes a rotary shaft, at whose end a tool is situated, which can vary as a function of the operations for which the appliance is meant. A peripheral incorporated protection for the tool is made up of an independent piece situated in detachable connection. The rotary transmission shaft incorporates at the end an extension piece connected by means of fitting with free extraction, and holding the tool. For thorough cleaning, the arm is disassembled by removing the peripheral protection and extracting the extension piece with the tool.

The mincer arm described in EP 1 407 701 A1 has the disadvantage that the tool has to be touched when disassembling and reassembling the arm. This can be quite dangerous in case the tool is a blade or knife.

Accordingly, it is an object of the present invention to provide a blender arm that is less dangerous to handle when cleaning it, and a food processor with such an arm respectively.

In a first aspect of the present invention, this object is achieved by a blender arm having a tubular body equipped at one end with a connection for a power unit, including axially a rotary shaft including a tool at the end opposite to the connection end, around which tool a peripheral protection is established, wherein the rotary shaft with the tool is attached movably in axial direction to the tubular body, so that the tool may be positioned in a retracted position—suited for operation—or a protracted position—suited for cleaning.

The distinction between retracted and protracted position is to be seen with respect to the peripheral protection. In a retracted position, the tool is inside the peripheral protection, thus ensuring safe operation. In a protracted position, the tool is outside the peripheral protection, thus ensuring an easy and thorough cleaning by holding the tool under a water flush, because the water easily reaches the area behind the tool. By doing so, the part of the rotary shaft near the tool and outside the tubular body is cleaned as well, thus avoiding that residues enter the inner part of the tubular body.

The blender arm according to the present invention has the advantage that it can be cleaned without any need of directly touching the tool. Especially, if the tool includes a blade or a knife, the danger of injuring oneself, when trying to clean the blender arm, is reduced significantly. Furthermore, the cleaning may be done much faster without having to disassemble and reassemble the blender arm.

There are many possibilities to actuate the rotary shaft to change the position of the tool. In embodiments where the blender arm is removably connected to a power unit, the simplest possibility is to push the rotary shaft on the connection side to move the tool from a retracted to a protracted position.

In other embodiments, e.g. if the blender is irremovably connected with the part of a food processor containing the power unit, or if cleaning will be possible without removing the blender arm, or if the handling will be simplified, the rotary shaft is functionally connected to an actuating element designed as part of the tubular body and moving the rotary shaft in axial direction from the retracted position to the protracted position of the tool. This actuating element may be for example a push button or a movable ring connected to the rotary shaft and moving it in axial direction.

In preferred embodiments, the rotary shaft with the tool is attached movably in axial direction to the tubular body, so that the tool returns automatically from the protracted position to the retracted position. This has the advantage, that the user does not have to particularly handle the rotary shaft with tool by e.g. pushing or drawing it manually back to the retracted position, thus considerably reducing the danger of injuring himself with the tool.

Preferably, the blender arm further comprises a resilient element functionally connected to the tubular body and the rotary shaft for moving the rotary shaft from the protracted position to the retracted position of the tool. This has the considerable advantage that, as soon as one releases the rotary shaft directly or the actuating element, the tool automatically returns to the retracted position. The probability of inadvertently touching the tool and injuring oneself is even more reduced.

In other preferred embodiments, the blender arm further comprises a locking device locking the tool in the protracted position for the sake of more convenient handling. This avoids the necessity of holding the rotary shaft or the actuating element with one's finger in the protracted position during the whole cleaning.

In some preferred embodiments, the tool is releasably attached to the rotary shaft, wherein release is possible in the protracted position, thus allowing exchange of the tool to sharpen it or replace it with a new one. In this case, it is advantageous to provide a locking device to reduce the danger of injuries during exchange of the tool.

In some other preferred embodiments, the tool is releasably attached to the rotary shaft, too, but may be positioned in a second protracted position for release. Advantageously this second protracted position places the tool further outside the peripheral protection compared to the first protracted position to make the release of the tool easier.

In a further aspect of the invention, this object is achieved by a food processor with a power unit and a blender arm as explained connected to the power unit. The blender arm can be an integral part of the food processor or be removably attached to the part containing the power unit.

Preferred embodiments of the food processor further comprise a safety switch device for controlling the tool's position and allowing operation in case the tool is positioned in retracted position. This removes the danger of operating the tool when it is not protected by the peripheral protection, and injuring persons or making a mess of a kitchen by splashing around the food to be processed.

A detailed description of the invention is provided below. Said description is provided by way of a non-limiting example to be read with reference to the attached drawings in which:

FIG. 1c shows the first embodiment of the blender arm according to the present invention from below;

Figure 1B:
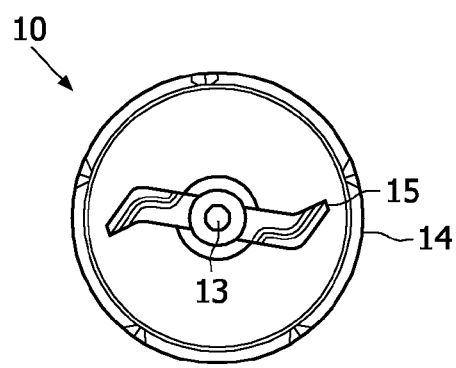
FIG. 1b shows the first embodiment of the blender arm according to the present invention in a protracted position.
Figure 1A:
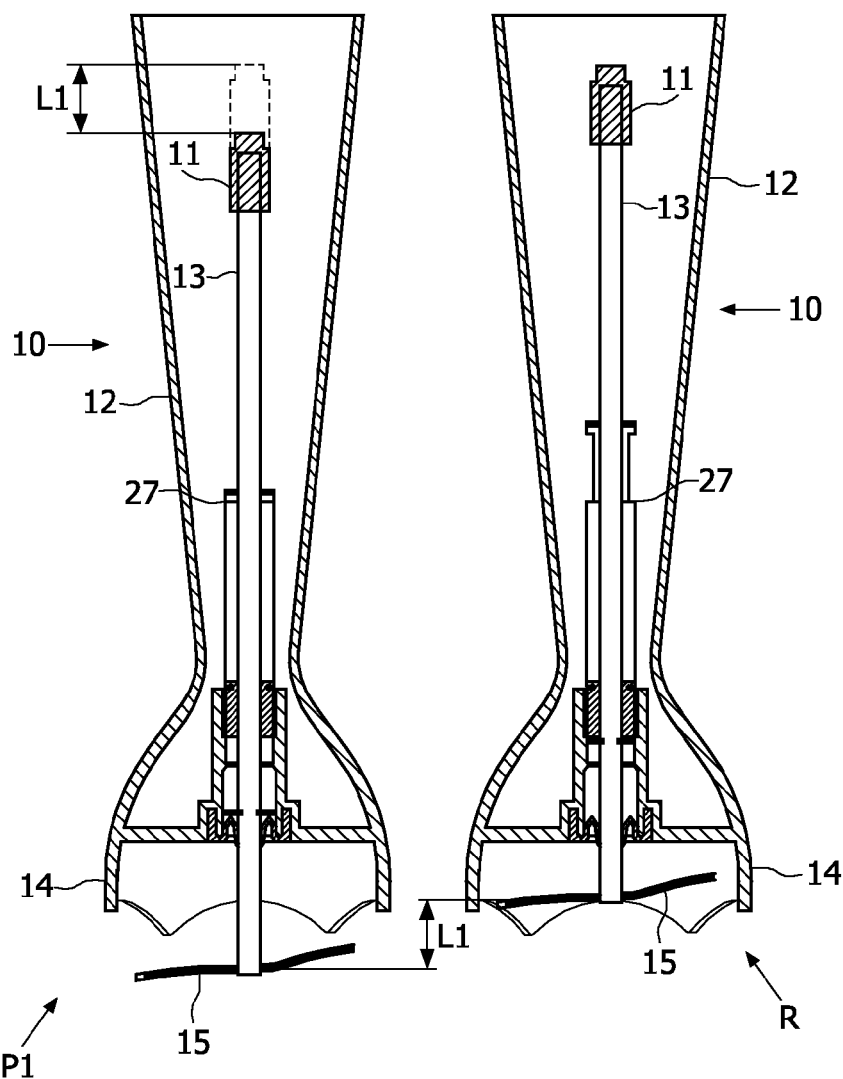
FIG. 1a shows a first embodiment of the blender arm according to the present invention in a retracted position.

FIGS. 1a, b, c show a first embodiment of a blender arm 10 according to the present invention, FIGS. 1a and 1b as cut in axial direction and FIG. 1c from below. The main components are a tubular body 12 including a rotary shaft 13. At the lower end (as shown in FIG. 1), the tubular body 12 is enlarged to form a cage 14 as peripheral protection around the blade 15, fixed at the lower end of the rotary shaft 13. The upper end of the rotary shaft 13 shows a connection 11 to connect the rotary shaft 13 to a power unit (not shown) to induce it into rotation to operate the blade 15. The rotating blade 15 then chops or purees or mixes what is surrounding it.

The rotary shaft 13 is held inside the tubular body 12, so that it can be moved in axial direction by pushing, e.g. with the finger onto the connection 11, so that the blade 15 moves over a length L1 from a retracted position R inside the cage 14 (FIG. 1a) to a protracted position P1 outside the cage 14 (FIG. 1b). In contrast to position R, position P1 allows to easily wash the lower part of the blender arm 10 even behind the blade 15 to thoroughly remove any residues, as well as the lower end of the rotary shaft 13. As the blade 15 is moved to its protracted position P1 just by pushing the rotary shaft 13 at the other end, there is no need to touch the blade 15 itself for cleaning.

By moving the rotary shaft 13 with the blade 15 from position R to position P1 the pneumatic resilient element 27 is compressed. One could also use resilient elements based on liquids or any other resilient elements known in the art.

Due to the pneumatic resilient element 27, one should press the connection 11 during the whole cleaning process to keep the blade 15 in position P1. As one stops pressing, the pneumatic resilient element 27 immediately decompresses and moves the rotary shaft 13 and with it the blade 15 automatically back from position P1 to position R inside the cage 14. This reduces the danger of inadvertently touching the blade 15 during or after the cleaning. It will be noted, that an automatic movement back to the retracted position R may be achieved by more complex means as well, e.g. by using a motor.

Compared to blender arms according to the state of the art, no time-consuming and dangerous disassembling and reassembling is necessary to clean the blender arm 10 according to the present invention. Furthermore, there are no loose parts that could get lost.

Figure 2A:
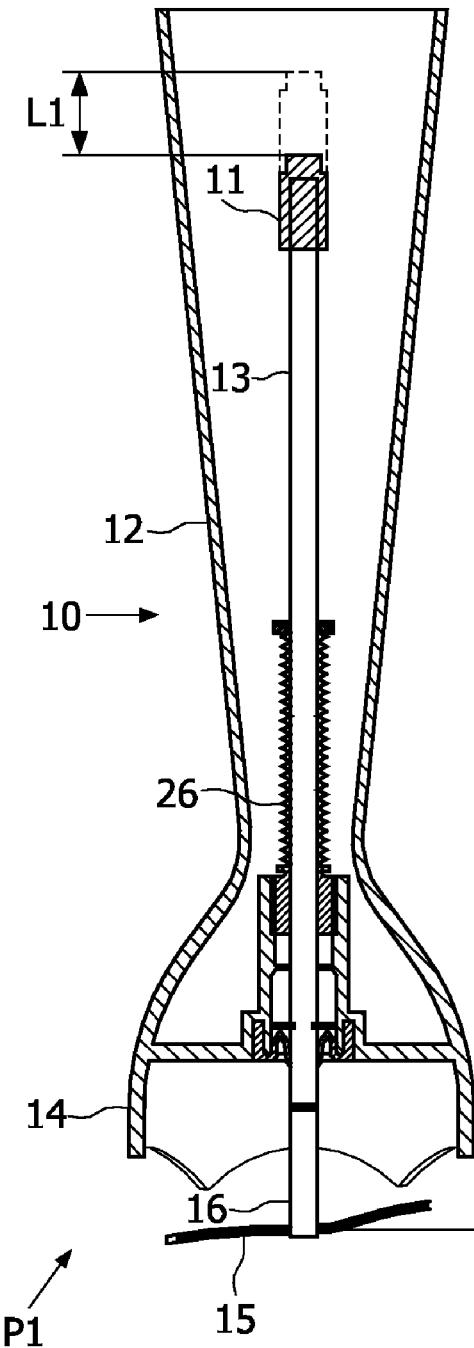
FIG. 2a shows a second embodiment of the blender arm according to the present invention in a protracted position.
Figure 2B:
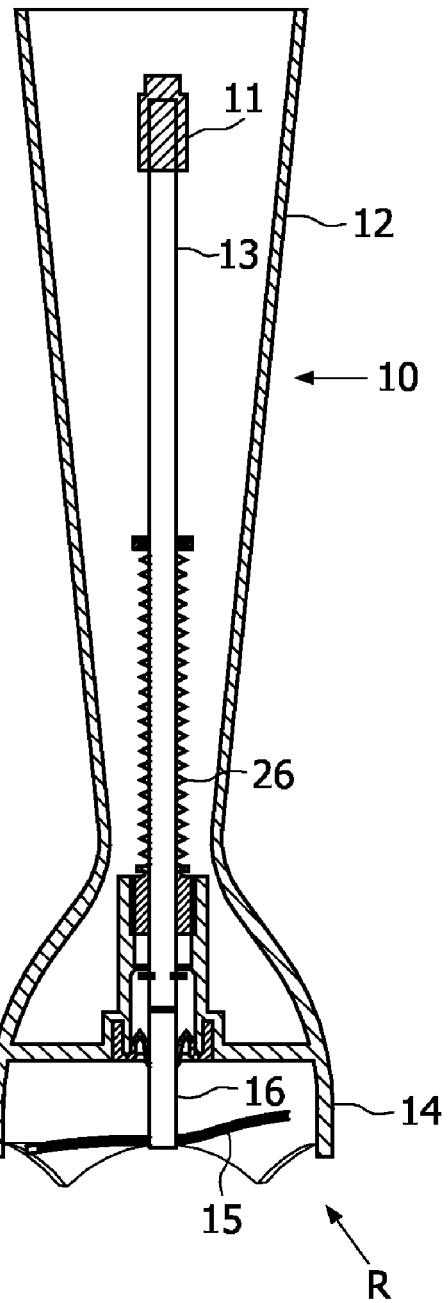
FIG. 2b shows the second embodiment of the blender arm according to the present invention in a retracted position.

FIGS. 2a,b show another embodiment of the blender arm 10 according to the present invention. The pneumatic resilient element has been replaced by a metal spring 26 that is expanded, when the blade 15 is in the retracted position R, and compressed, when the blade 15 is in the protracted position P1. Furthermore, the blade 15 is fixed to the blade shaft 16, which in turn is releasably attached to the rotary shaft 13. The blender arm 10 of FIGS. 2a,b gives the possibility of removing the blade 15 with blade shaft 16 for sharpening or exchanging it with a new one, when the blade 15 is in position P1.

Figures 3A, 3B:
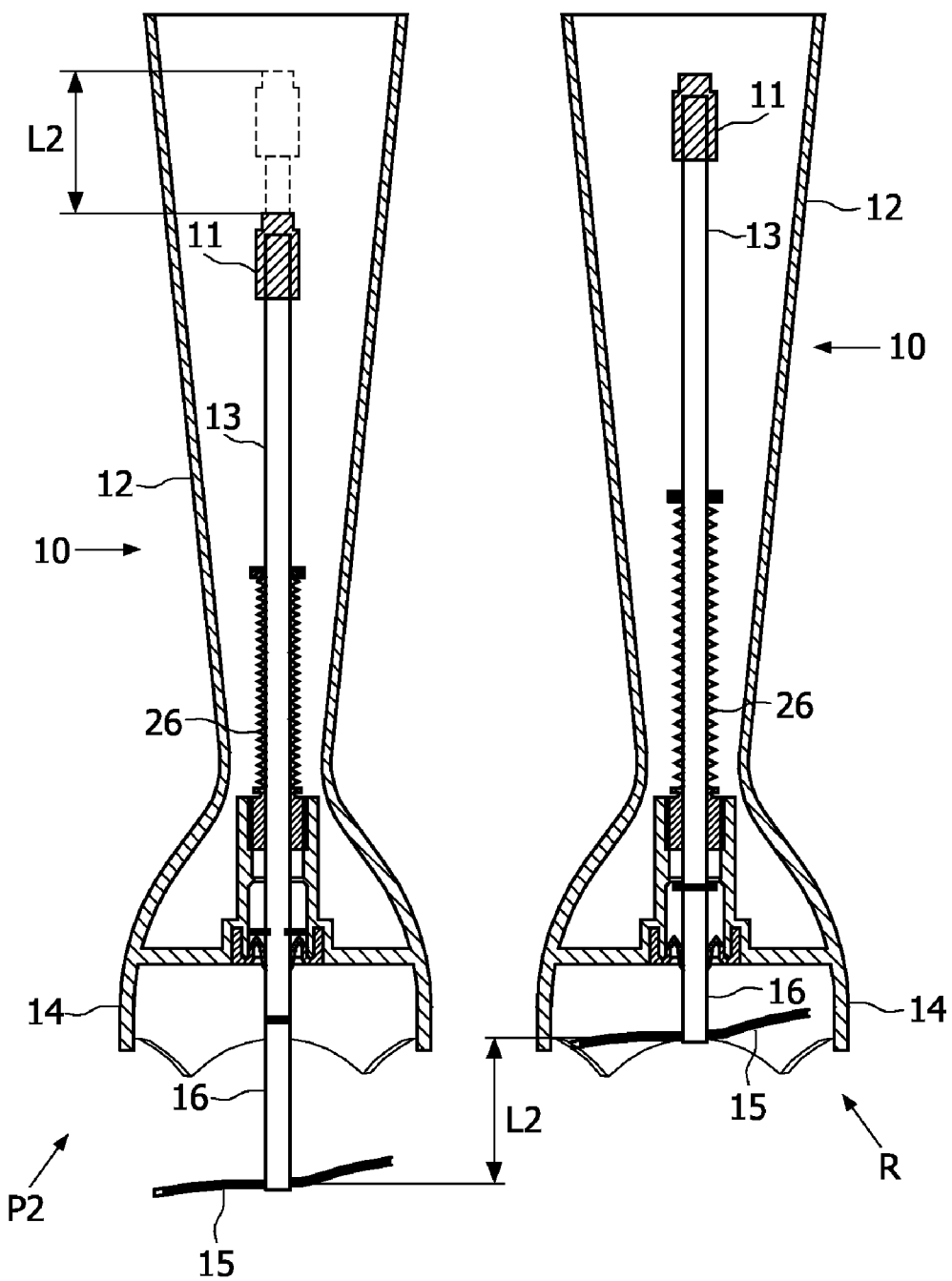
FIG. 3a shows a third embodiment of the blender arm according to the present invention in a protracted position.
FIG. 3b shows the third embodiment of the blender arm according to the present invention in a retracted position.

In a further embodiment with releasable blade 15, as shown in FIGS. 3a,b, removing of the blade 15 with blade shaft 16 is possible only in a further protracted position P2, where the blade 15 is further outside the cage 14, i.e. the rotary shaft 13 has been moved over a length L2 larger than L1. This avoids for example random loosening of the blade shaft 16 during cleaning.

Figures 4A, 4B:
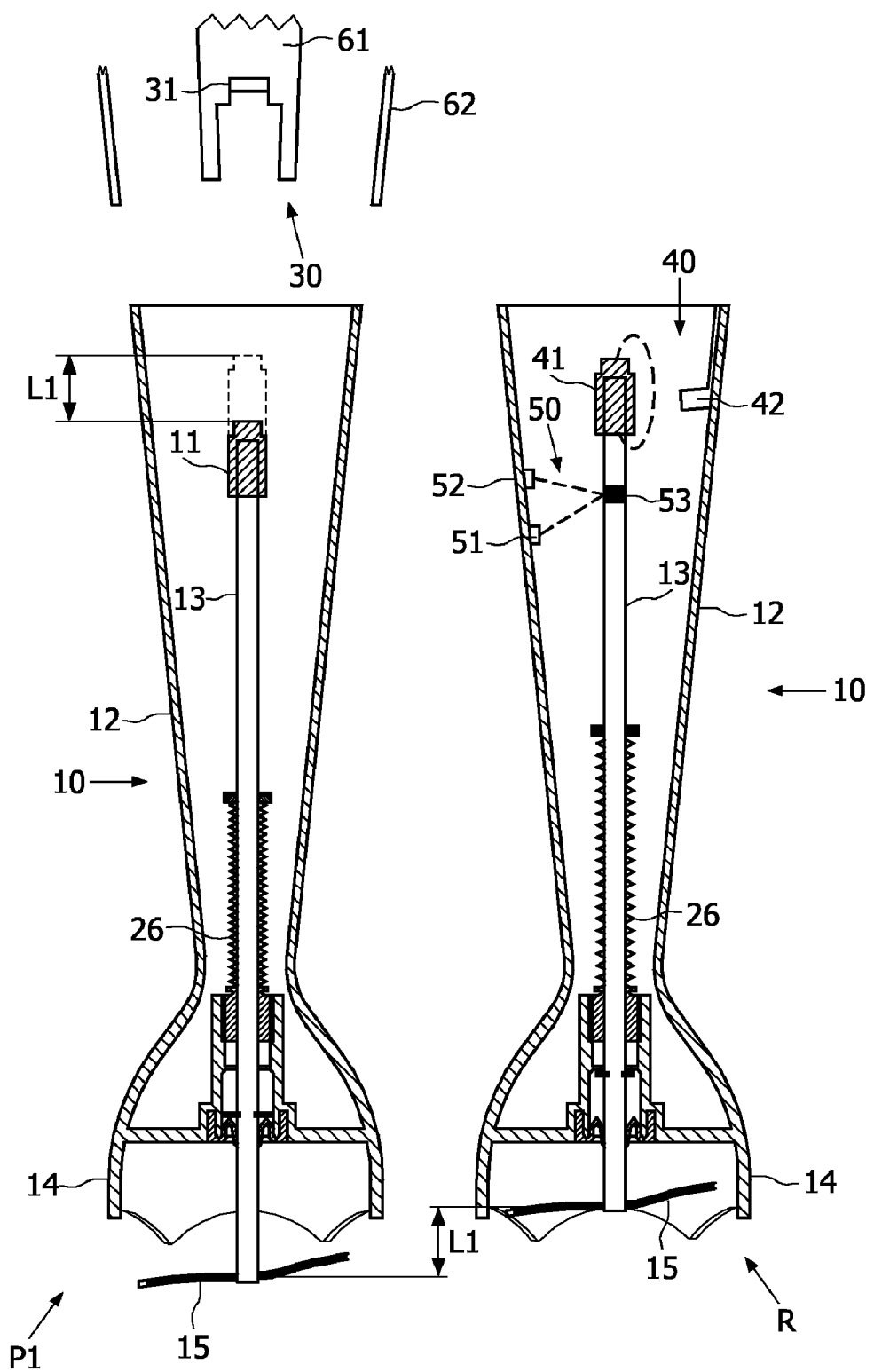
FIG. 4a shows a fourth embodiment of the blender arm according to the present invention in a retracted position.
FIG. 4b shows the fourth embodiment of the blender arm according to the present invention in a protracted position.

FIGS. 4a,b show embodiments of the blender arm 10 according to the present invention with various safety switches 30, 40, 50 that make sure that the blade 15 is not operated in the protracted position P1, which could be dangerous and a nuisance if the food to be processed is splashed around. These possibilities are to be taken as examples only. Any kind of appropriate safety switch known in the art can be used as well.

One possibility for a safety switch 30 is shown in FIG. 4a. There, the connection 11 cooperates with a mechanical switch 31 in the motor block connection 61 inside the housing 62 of a power unit part of a food processor. If the connection 11 is inserted into the motor block connection 61, it presses onto the mechanical switch 61 and thus allows the motor block to be powered, in case the general switch of the food processor is switched on.

Two further possibilities of safety switches 40, 50 are illustrated in FIG. 4b. The safety switch 40 is based on a magnetic approach. The connection 41 is made of magnetic material. The magnetic switch 42 on the inner side of the tubular body 12 measures the magnetic field (broken line) of the magnetic connection 41. If a certain magnetic field is reached, because the magnetic connector 11 is near enough to the magnetic switch 42, i.e. the blade 15 in a retracted position R, a corresponding signal is transmitted to some power control of the food processor allowing the motor block to be powered, if desired.

The safety switch 50 is an optical one. There is a mark 53 on the rotary shaft 13 indicating the blade 15 which is in the retracted position R. By means of a light emitter 51 (light symbolized by broken line), e.g. a light emitting diode, and a detector 52, e.g. a photo diode, it can be detected whether the right position is reached or not, and corresponding signals are sent to some power control of the food processor.

FIGS. 5a to 5d show different embodiments of a hand blender 1 with a blender arm 10 according to the present invention. To simplify the handling during cleaning, various actuating elements are provided. The actuating elements are connected to the rotary shaft inside the tubular body by conventional means, e.g. mechanical means, to translate the movement of the actuating element into an appropriate movement of the rotary shaft in axial direction. The blender arm 10 is attached to a power unit part 6 of the hand blender 1. The hand blender 1 is switched on and off by means of the switch 63.

Figure 5A:
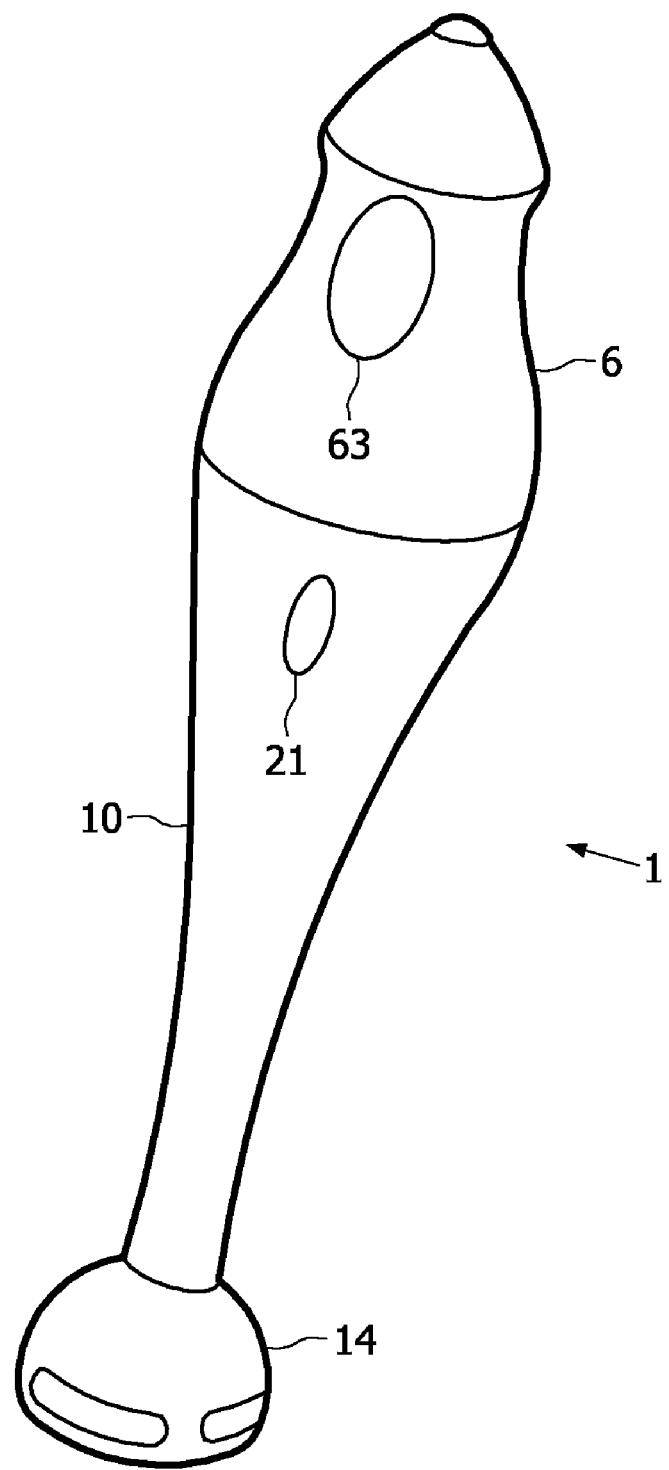
FIG. 5a shows a first embodiment of a hand blender according to the present invention.

The embodiment of FIG. 5a has a button 21 that has to be pushed and held to get the blade into a protracted position and stay in it during cleaning. If the button 21 is released, the blade moves automatically back to a retracted position due to a resilient element, as explained before. It will be noted that in view of the cage 14 having openings, it could be enough to move the blade, for safety reasons, only up to the height of the openings of the cage for cleaning, but it would be more complicated to reach the same cleaning result as with a blade outside the cage 14.

Figure 5B:
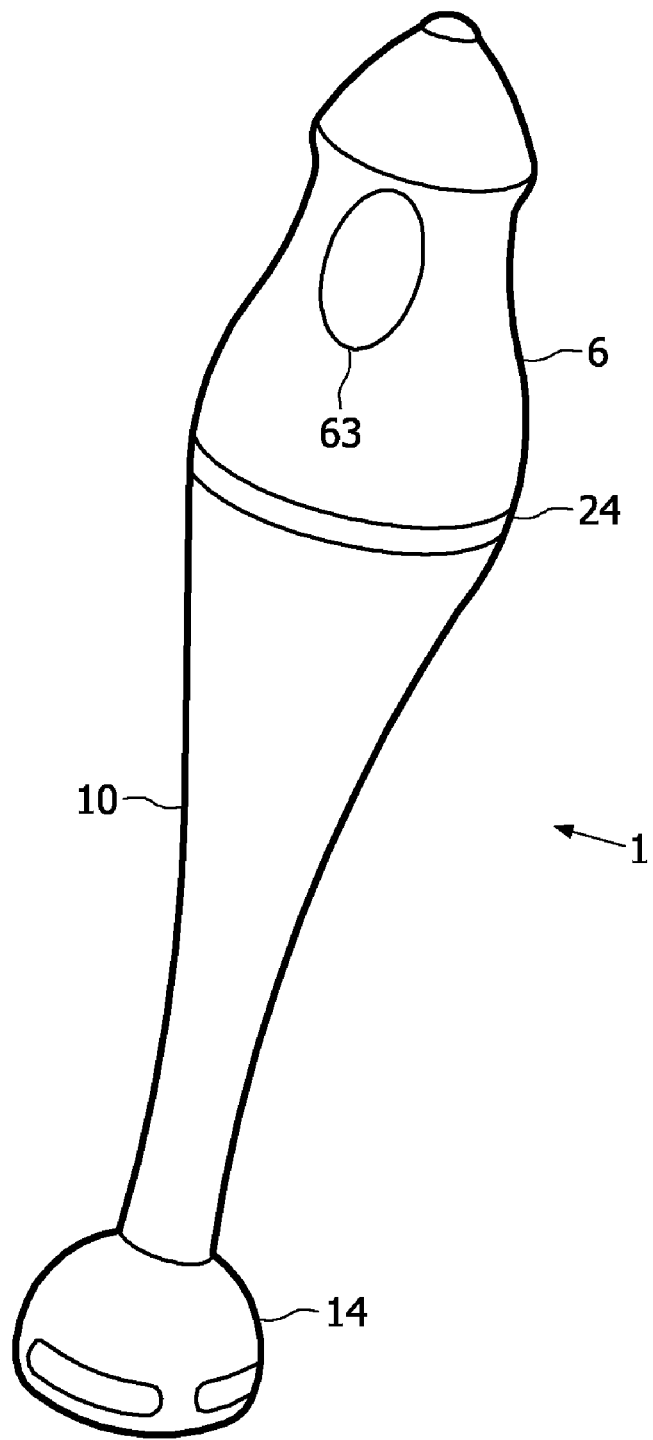
FIG. 5b shows a second embodiment of a hand blender according to the present invention.

The embodiment illustrated in FIG. 5b shows a ring 24 instead of the button 21. The ring has to be turned to move the rotary shaft with the blade.

Figure 5C:
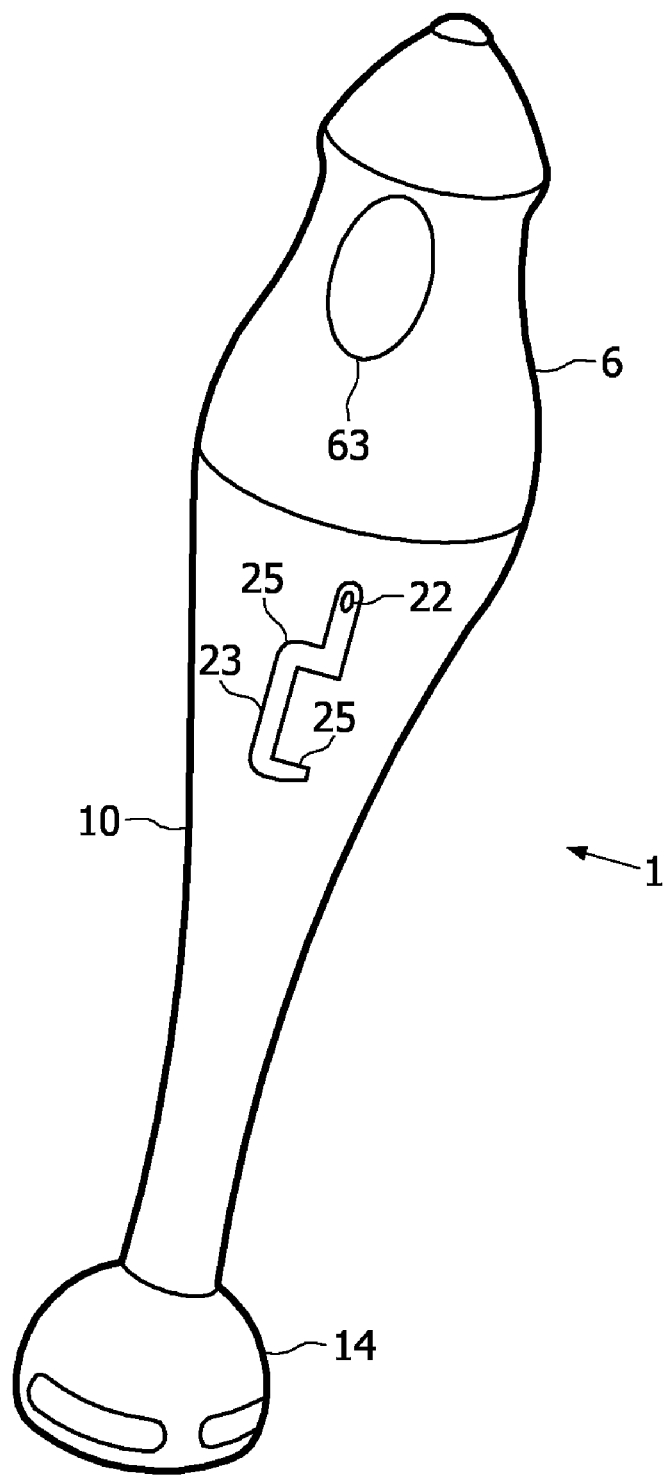
FIG. 5c shows a third embodiment of a hand blender according to the present invention.

The embodiment of FIG. 5c has a button 22 to be pushed along the guidance 23. The button 22 can be pushed into two different positions in which it can be locked by pushing it to the side against an edge 25, e.g. against the resilient force of any resilient element. The different positions of the button 22 are equivalent to different positions of the blade. The actual position is the most retracted one. If the user so desires, it is not necessary to push the button up to a locking position, but can stop anywhere in-between, if that is enough to thoroughly clean the tool or remove the tool. But if there is a resilient element forcing the rotary shaft and the tool back to the most retracted position, the user should hold the button 22 in that position until he is done.

Figure 5D:
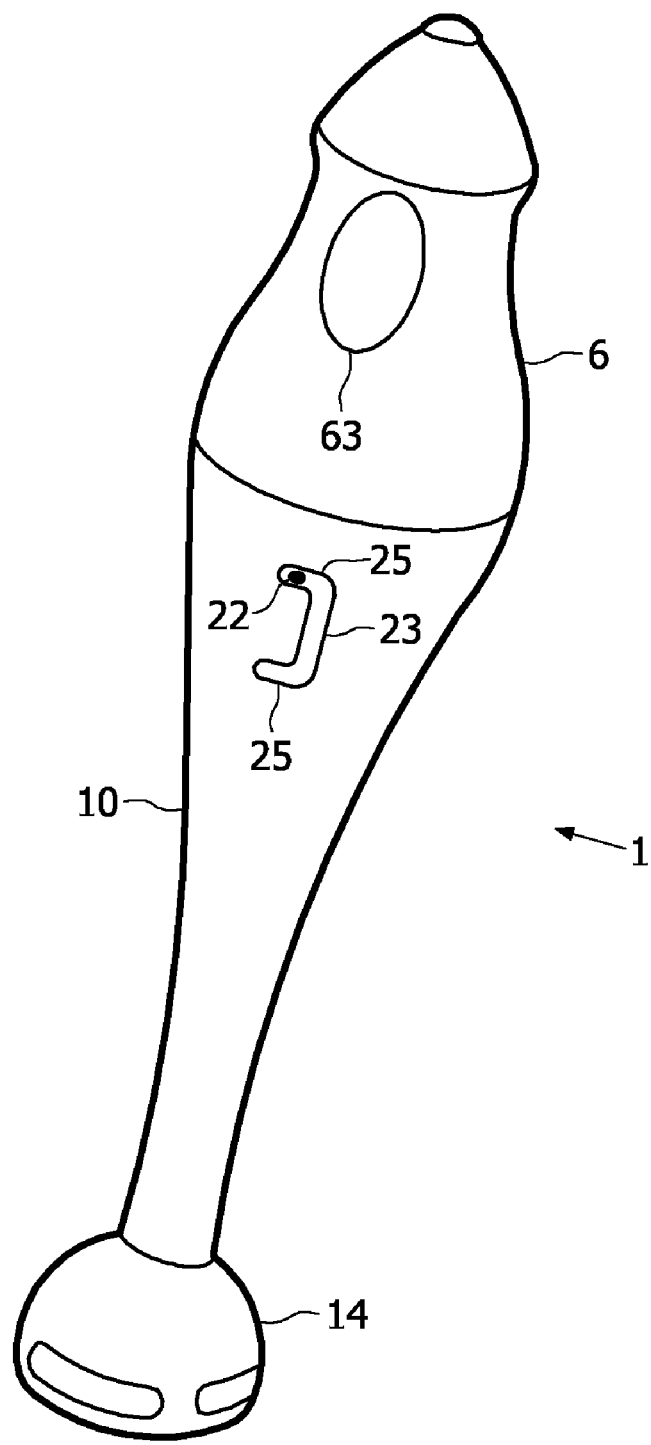
FIG. 5d shows a fourth embodiment of a hand blender according to the present invention.
Figure 6:
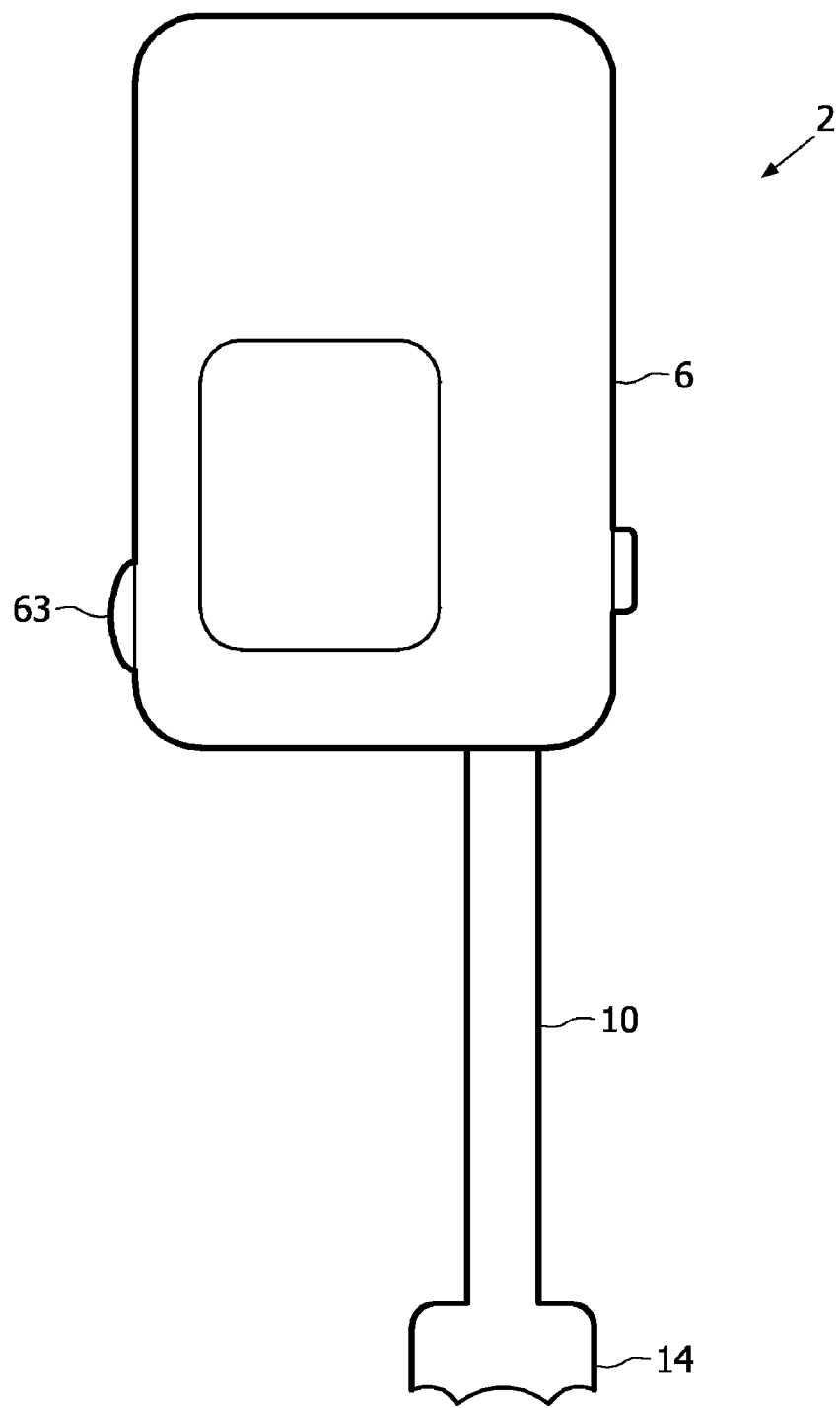
FIG. 6 shows an embodiment of a hand mixer with a blender arm according to the present invention.

FIG. 5d shows an embodiment similar to the embodiment of FIG. 5c, but with only one locking position.

It will be noted that any other kind of actuating and/or locking element known to the person skilled in the art may be utilized.

The present invention may be applied to any other food processor than a hand blender, for example a hand mixer 2 with blender arm 10, wherein the hand mixer 2 contains the motor part 6 for driving the blender arm 10.

Although having described several preferred embodiments of the invention, those skilled in the art will appreciate that various changes, alterations, and substitutions can be made without departing from the spirit and concepts of the present invention. The invention is, therefore, claimed in any of its forms or modifications with the proper scope of the appended claims. For example various combinations of the features of the following dependent claims could be made with the features of the independent claim without departing from the scope of the present invention. Furthermore, any reference numerals in the claims shall not be construed as limiting the scope.

LIST OF REFERENCE NUMERALS 1 hand blender
2 hand mixer
6 motor part
10 blender arm
11 connection
12 tubular body
13 rotary shaft
14 cage
15 blade
16 blade shaft
21 push button
22 button
23 guidance
24 ring
25 locking edge
26 spring
27 pneumatic resilient element
30 safety switch
31 mechanical switch
40 safety switch
41 magnet
42 magnetic switch
50 safety switch
51 light emitting diode
52 photo diode
53 mark
61 motor block connection
62 housing
63 switch
R retracted position
P1, P2 protracted position
L1, L2 length

The invention claimed is:

1. A blender arm comprising:
   a tubular body equipped at a first end with a connection for connection to a power unit;
   a rotary shaft configured to rotate around an axial axis of the blender arm, the rotary shaft having a tool at a second end of the tubular body opposite to the first end;
   a peripheral protection located around the tool;
   wherein the rotary shaft with the tool is attached movably in an axial direction to the tubular body so that the tool is movable between a retracted position where the tool is surrounded by the peripheral protection and an extended position where the tool is outside the peripheral protection.

2. The blender arm according to claim 1, wherein the rotary shaft is functionally connected to an actuating element designed as part of the tubular body for moving the rotary shaft in an axial direction from the retracted position to the extended position of the tool.

3. The blender arm according to claim 1, wherein the rotary shaft with the tool is attached movably in an axial direction to the tubular body so that the tool returns automatically from the extended position to the retracted position.

4. The blender arm according to claim 1, further comprising a resilient element functionally connected to the tubular body and the rotary shaft for moving the rotary shaft from the extended position to the retracted position of the tool.

5. The blender arm according to claim 1, wherein it further comprises a locking device locking the tool in the extended position.

6. A food processor comprising:
   a power unit; and
   a blender arm connected to the power unit
   wherein the blender arm comprises:
   a tubular body equipped at a first end with a connection for connection to the power unit;
   an axially rotating shaft with a tool at a second end opposite to the first end;
   a peripheral protection located around the tool;
   wherein the axially rotating shaft with the tool is attached movably in an axial direction to the tubular body so that the tool is movable between a retracted position and an extended position; and
   a safety switch device for controlling a position of the tool and allowing operation in case the tool is positioned in the retracted position.

* * * * *